UNITED STATES PATENT OFFICE.

JAMES JOHN BARNES, OF MINERAL WELLS, TEXAS, ASSIGNOR OF ONE-HALF TO JOHN FRANKLIN COLWELL, OF MINERAL WELLS, TEXAS.

FIREPROOF AND WATERPROOF PAINT.

965,619.

Specification of Letters Patent. Patented July 26, 1910.

No Drawing. Application filed July 26, 1909. Serial No. 509,749.

*To all whom it may concern:*

Be it known that I, JAMES JOHN BARNES, a citizen of the United States, residing at Mineral Wells, in the county of Palo Pinto and State of Texas, have invented a Fireproof and Waterproof Paint, a new and useful composition of matter to be used for painting the roofs of houses or any kind of wood, tin, or iron that is exposed to the weather and heat or cold, of which the following is a specification.

My composition consists of the following ingredients, combined in the proportions stated, viz: English resin 5 pounds, alum, pulverized, 5 pounds, graphite 5 pounds, mineral red 10 pounds, hydrocarbon 5 gallons, gloss oil 2 gallons, coal tar 40 gallons.

The above ingredients in the above proportions are sufficient to make one barrel of B. & C. fire proof and water proof paint.

The ingredients of the above composition, the English resin, pulverized alum, graphite, mineral red, hydro carbon, and gloss oil, should be thoroughly mixed by stirring up together and should then be poured into the coal tar.

In using the above named composition it should be thoroughly stirred before being used and should be put on or used cold and should not be heated.

The above composition can be used in cold weather the same as in hot weather.

The oil called gloss oil used in this composition of matter is the rosin oil, which is made by the distillation of rosin by itself, and the heavier fraction, or rosin oil, in the stricter sense of the word is the gloss oil used in this composition of matter.

The English resin used in this composition of matter is the residue left after the distillation of the oil of turpentine from crude oleo-resin (turpentine) of various species of pinus, and is the resin which is called on the continent of Europe, colophone, but with us is commonly and now officially known by the name of rosin. It is the resina of the United States and British pharmacopœias and is sometimes called resina flava or yellow rosin, and is used in this composition of matter because it is darker and cheaper than any other resin known.

By using the above composition the pores of the wood are filled. The English resin and gloss oil penetrate and fill the pores of the wood and cause the composition to dry quickly and hard, and the gloss oil gives the composition or paint a glossy finish and the gloss oil and English resin make the wood or surface smooth as well as glossy and the pores of the wood being thus filled the wood becomes water proof. The pulverized alum also saturates the pores of the wood and hardens the composition or paint and makes the wood practically fire proof. The hydro carbon cuts or thins the composition or paint down so it can be put on smoothly and evenly. The graphite, mineral red, and coal tar are merely bodies or fillers.

Exposure to heat or cold does not affect the composition and does not affect wood or other material painted with the above composition and the above composition preserves the wood or other painted surface from water and the above composition not being affected by heat or cold does not scale or crack and does not puddle when drying but dries smooth and even and saturates the wood and the above composition does not become gummy or sticky but dries hard and glossy and the above composition does not blister and wood or any other material can at any time be repainted or recoated with the same composition, above set out, and will always have a smooth even glossy surface.

I am not aware that there is any other composition or paint in which all of the ingredients of my above named composition have been used together.

I claim:

The herein-described composition of matter for painting the roofs of houses, or any kind of wood, tin, or iron, that is exposed to the weather or heat or cold or water or fire, consisting of English resin 5 pounds, pulverized alum 5 pounds, graphite 5 pounds, mineral red 10 pounds, hydro carbon 5 gallons, gloss oil 2 gallons, coal tar 40 gallons, substantially as described.

JAMES JOHN BARNES.

Witnesses:
FRANK RICHARDS,
W. T. HILES.